(12) United States Patent
Huang et al.

(10) Patent No.: US 11,354,427 B2
(45) Date of Patent: Jun. 7, 2022

(54) ENCRYPTING/DECRYPTING METHOD FOR MULTI-DIGIT NUMBER AND ENCRYPTING/DECRYPTING SERVER

(71) Applicant: WELAB INFORMATION TECHNOLOGY (SHENZHEN) LIMITED, Shenzhen (CN)

(72) Inventors: Rongcun Huang, Shenzhen (CN); Hanquan Liang, Shenzhen (CN); Hui Yang, Shenzhen (CN)

(73) Assignee: WELAB INFORMATION TECHNOLOGY (SHENZHEN) LIMITED, Guangdong (CN)

( * ) Notice: Subject to any disclaimer, the term of this patent is extended or adjusted under 35 U.S.C. 154(b) by 0 days.

(21) Appl. No.: 16/772,777

(22) PCT Filed: Jan. 17, 2018

(86) PCT No.: PCT/CN2018/072921
§ 371 (c)(1),
(2) Date: Jun. 13, 2020

(87) PCT Pub. No.: WO2019/114084
PCT Pub. Date: Jun. 20, 2019

(65) Prior Publication Data
US 2020/0327239 A1 Oct. 15, 2020

(30) Foreign Application Priority Data

Dec. 15, 2017 (CN) .......................... 201711344638.7

(51) Int. Cl.
*G06F 21/60* (2013.01)
*H04L 9/32* (2006.01)

(52) U.S. Cl.
CPC .......... *G06F 21/602* (2013.01); *H04L 9/3242* (2013.01)

(58) Field of Classification Search
CPC ... G06F 21/602; H04L 9/3242; H04L 9/3239; H04L 9/0618; H04L 9/0643
See application file for complete search history.

(56) References Cited

U.S. PATENT DOCUMENTS

2010/0220853 A1* 9/2010 Schneider ............. H04L 9/0643
380/29
2016/0180200 A1* 6/2016 Vijayanarasimhan ......................
G06N 3/082
382/157
(Continued)

FOREIGN PATENT DOCUMENTS

CN 102521679 A 6/2012
CN 103906039 A 7/2014
(Continued)

OTHER PUBLICATIONS

International Search Report, dated Sep. 6, 2018 for corresponding International Application No. PCT/CN2018/072921 with English translation (5 pages).
(Continued)

*Primary Examiner* — Jung W Kim
*Assistant Examiner* — Sangseok Park
(74) *Attorney, Agent, or Firm* — Intellectual Property Law Group LLP

(57) ABSTRACT

The present invention relates to an encrypting/decrypting method for a multi-digit number and an encrypting/decrypting server. The encrypting method comprises: after receiving a preset type of multi-digit number to be encrypted, according to a pre-determined encrypting digit determination rule, determining a number segment to be encrypted having a first preset number of digits and a non-encrypting number segment except the number segment to be encrypted; performing operational processing on the determined non-encrypting number segment using a pre-defined encrypting cryptographic algorithm and key corresponding to the multi-digit number to be encrypted to generate an operational value; performing an encrypting mixing operation on the number segment to be encrypted and the generated operational value using a pre-determined encrypting
(Continued)

---

After receiving a preset type of multi-digit number to be encrypted, according to a predetermined encryption digits determination rule, determining a number segment to be encrypted having a first preset number of digits and determining a number segment not to be encrypted except the number segment to be encrypted — S10

Performing a calculation on the determined number segment not to be encrypted using a predefined encryption cryptographic algorithm and key corresponding to the multi-digit number to be encrypted to generate an operational value — S20

Performing a hybrid encryption operation on the number segment to be encrypted and the generated operational value using a predetermined hybrid encryption algorithm to obtain a hybrid encrypted number segment having the first preset number of digits — S30

Replacing the number segment to be encrypted in the preset type of multi-digit number to be encrypted with the hybrid encrypted number segment to generate an encrypted multi-digit number — S40 mixing operation algorithm to obtain a mixingly encrypted number segment having the first preset number of digits; and replacing the number segment to be encrypted in the preset type of multi-digit number to be encrypted with the mixingly encrypted number segment to generate an encrypted multi-digit number. The method improves the security of the protection to a multi-digit number.

21 Claims, 4 Drawing Sheets

(56) References Cited

U.S. PATENT DOCUMENTS

2018/0276399 A1* 9/2018 Hakamata ........... G06F 21/6227
2018/0337778 A1* 11/2018 Scheiblauer .......... H04L 9/3239

FOREIGN PATENT DOCUMENTS

| CN | 105966111 A | 9/2016 |
| CN | 106295367 A | 1/2017 |
| CN | 107124500 A | 9/2017 |

OTHER PUBLICATIONS

Written Opinion of the ISA, dated Sep. 6, 2018 for corresponding International Application No. PCT/CN2017/072921 (3 pages).

* cited by examiner

ENCRYPTING/DECRYPTING METHOD FOR MULTI-DIGIT NUMBER AND ENCRYPTING/DECRYPTING SERVER

CROSS-REFERENCE TO RELATED APPLICATIONS

This application is a U.S. National Phase application, under 35 U.S.C. § 371, of International Application no. PCT/CN2018/072921, with an international filing date of Jan. 17, 2018, and claims benefit of China Application no. CN 201711344638.7 filed on Dec. 15, 2017; each of which is hereby incorporated by reference for all purposes.

TECHNICAL FIELD

The present invention relates to the field of computer technology, in particular to methods and servers for the encryption and decryption of multi-digit numbers.

BACKGROUND OF THE INVENTION

Along with the continual advancements in traditional and mobile Internet, there are increasing ways to acquire private information of the public (e.g. mobile phone numbers, bank account numbers, certificate numbers and other private information). (For example, courier receipts display the mobile numbers of the receiver and the sender; airline tickets contain the certificate number of the passenger; bank account numbers are shown in bank receipts). This poses a great challenge to normal life and work order of the public.

In response to this issue, government departments and companies involved with the use of private information of the public are taking specific measures to protect such information. However, these entities generally utilize a mask to conceal a part of the number, adopt symmetrical or asymmetric encryption algorithms to encrypt fields such as mobile numbers, or develop a data mapping table and a table look-up to substitute the original and encrypted numbers.

Current encryption methods or algorithms for private information such as mobile numbers, bank account numbers, and certificate numbers are too simple, or the confidentiality of private information depends only on the confidentiality of the data mapping table. Consequently, the security of private information is not adequately protected.

SUMMARY OF THE INVENTION

The present invention aims to provide methods and servers for encryption and decryption to strengthen the security of multi-digit numbers.

In order to realize the above objective, the present invention provides an encryption method for multi-digit numbers which is applied to an encryption server. The encryption method comprises:

after receiving a preset type of a multi-digit number to be encrypted, determining a number segment having first preset digits to be encrypted and the number segment not to be encrypted other than the number segment to be encrypted, in accordance with rules for determination of predetermined encryption digits;

performing a calculation on the determined number segment not to be encrypted to generate an operational value, by using a predefined encryption cryptographic algorithm and key, corresponding to the multi-digit number to be encrypted;

performing a hybrid encryption operation on the number segment to be encrypted and the operational value generated, by employing a predetermined hybrid encryption algorithm for obtaining a hybrid encrypted number segment having the first preset digits; and replacing the number segment to be encrypted in the preset-type of multi-digit number to be encrypted with the hybrid encrypted number segment to generate an encrypted multi-digit number.

Preferably, after the number segment to be encrypted in the preset type of the multi-digit number to be encrypted is substituted with the hybrid encrypted number segment to generate the encrypted multi-digit number, the method also includes:

generating an encryption identifier for the encrypted multi-digit number by following predetermined rules for number encryption identifiers. The predetermined rules for number encryption identifiers include:

in line with the meaning of the multi-digit number, one or more numbers of preset digits in the generated encrypted multi-digit number is converted into an encryption identifier corresponding to the type of the multi-digit number to be encrypted.

Preferably, the rules for the determination of the predetermined encryption digits include:

a number of second preset digits on the leftmost side in the multi-digit number to be encrypted is designated as the front number, while a number of third preset digits on the rightmost side in the multi-digit number to be encrypted is designated the back number. The front and back numbers are designated as the number segment not to be encrypted. The sum of the numbers of the second and the third preset digits is less than the number of digits of the multi-digit number to be encrypted. After the front and back numbers are removed from the multi-digit number to be encrypted, the remaining number segment is designated as the number segment to be encrypted.

Preferably, the predefined encryption cryptographic algorithm comprises a hash algorithm and a binary number conversion algorithm. The formula of the hash algorithm is:

$$\text{Hash} = \text{Digest}(Nl + Nr + K)$$

wherein, K represents the preset key corresponding to the multi-digit number to be encrypted, while Nl represents a number of the second preset digits on the leftmost side of the multi-digit number to be encrypted; Nr represents a number of the third preset digits on the rightmost side of the multi-digit number to be encrypted; and Hash represents the calculated Hash value.

The formula of the binary number conversion algorithm is:

$$\text{Num} = \text{CalcNum}(\text{Hash})$$

wherein, Num represents the conversion of the calculated Hash value from binary to decimal.

Preferably, the formula of the predetermined hybrid encryption algorithm is:

$$E\_Nm = (Nm + Num) \bmod 10^n$$

wherein, Nm represents the number segment to be encrypted, while Num represents the decimal operational value; n represents the number of digits of the number segment to be encrypted; and E_Nm represents the calculated hybrid encrypted number segment.

Moreover, in order to realize the above objective, the present invention provides a decryption method for multi-digit numbers, which is applied to a decryption server. The decryption method includes:

after receiving a preset type of a multi-digit number to be decrypted, determining a number segment having first preset digits to be decrypted and determining a number segment not to be decrypted other than the number segment to be decrypted, according to rules for determination of predetermined encryption digits;

performing a calculation on the determined number segment not to be decrypted to generate an operational value, by using a predefined decryption cryptographic algorithm and key, corresponding to the multi-digit number to be decrypted;

performing a hybrid decryption operation on the number segment to be decrypted and the operational value generated, by employing a predetermined hybrid decryption algorithm for obtaining a hybrid decrypted number segment having the first preset digits; and replacing the number segment to be decrypted in the preset type of multi-digit number to be decrypted with the hybrid decrypted number segment to generate a decrypted multi-digit number.

Preferably, the rules for the determination of predetermined digits to be decrypted include:

a number of second preset digits on a leftmost side of the multi-digit number to be decrypted is designated as a front number, while a number of third preset digits on a rightmost side of the multi-digit number to be decrypted is designated the back number. The front and back numbers are designated as the number segment not to be decrypted. The sum of the numbers of second preset digits and the third preset digits is less than the number of digits of the multi-digit number to be decrypted. The remaining number segment is designated as the number segment to be decrypted, after the front and back numbers are removed from the multi-digit number to be decrypted.

Preferably, the predefined decryption cryptographic algorithm includes a hash algorithm and a binary number conversion algorithm. The formula of the hash algorithm is:

$$Hash = Digest(Nl+Nr+K)$$

wherein, K represents a preset key corresponding to the multi-digit number to be decrypted, while Nl represents the number of second preset digits on the leftmost side of the multi-digit number to be decrypted; Nr represents the number of third preset digits on the rightmost side of the multi-digit number to be decrypted, and Hash represents a calculated Hash value.

The formula of the binary number conversion algorithm is:

$$Num = CalcNum(Hash)$$

wherein, Num represents the conversion of the calculated Hash value from binary to decimal.

Preferably, the predetermined hybrid decryption algorithm is:

$$Nm = (E\_Nm - Num) \bmod 10^n$$

wherein, E_Nm represents the number segment to be decrypted, while Num represents a decimal operational value, n represents a number of digits of the number segment to be decrypted, and Nm represents the calculated hybrid decrypted number segment.

Additionally, in order to realize the above objective, the present invention provides an encryption server. The encryption server comprises of a memory and a processor. The memory stores an encryption system for multi-digit numbers that is operable on the processor. According to an embodiment, the following steps can be implemented, when the encryption system for multi-digit numbers is executed by the processor:

after receiving a preset type of a multi-digit number to be encrypted, determining a number segment with first preset digits to be encrypted and determining a number segment not to be encrypted other than the number segment to be encrypted, according to rules for determination of predetermined encryption digits;

performing a calculation on the determined number segment not to be encrypted to generate an operational value, by using a predefined encryption cryptographic algorithm and key, corresponding to the multi-digit number to be encrypted;

performing a hybrid encryption operation of the number segment to be encrypted and the operational value generated, by employing a predetermined hybrid encryption algorithm for obtaining a hybrid encrypted number segment with the first preset digits; and replacing the number segment to be encrypted in the preset type of multi-digit number to be encrypted with the hybrid encrypted number segment to generate an encrypted multi-digit number.

Preferably, the following steps can be further implemented, when the encryption system for multi-digit numbers is executed by the processor:

generating an encryption identifier for the encrypted multi-digit number according to predetermined rules for number encryption identifiers; wherein the predetermined rules for number encryption identifiers include:

in line with a meaning of the multi-digit number, converting one or more numbers of preset digits in the generated encrypted multi-digit number into an encryption identifier corresponding to the type of the multi-digit number to be encrypted.

Preferably, the rules for the determination of the predetermined encryption digits include:

a number of second preset digits on a leftmost side of the multi-digit number to be encrypted is designated a front number, while a number of third preset digits on a rightmost side of the multi-digit number to be encrypted is designated a back number. The front and back numbers are designated as the number segment not to be encrypted. The sum of the numbers of the second and third preset digits is less than the number of digits of the multi-digit number to be encrypted. The remaining number segment is designated as the number segment to be encrypted, after the front and back numbers are removed from the multi-digit number to be encrypted.

Preferably, the predefined encryption cryptographic algorithm includes a hash algorithm and a binary number conversion algorithm. The formula of the hash algorithm is:

$$Hash = Digest(Nl+Nr+K)$$

wherein, K represents a preset key corresponding to the multi-digit number to be encrypted, while Nl represents the number of the second preset digits on the leftmost side of the multi-digit number to be encrypted, Nr represents the number of the third preset digits on the rightmost side of the multi-digit number to be encrypted, and Hash represents a calculated Hash value.

The formula of the binary number conversion algorithm is:

$$Num = CalcNum(Hash)$$

wherein, Num represents the conversion of the calculated Hash value from binary to decimal.

Preferably, the predetermined hybrid encryption algorithm is:

$$E\_Nm=(Nm+Num)\mod 10^n$$

wherein, Nm represents the number segment to be encrypted, while Num represents a decimal operational value, n represents a number of digits of the number segment to be encrypted, and E_Nm represents the calculated hybrid encrypted number segment.

Additionally, in order to realize the above objective, the present invention provides a decryption server. The decryption server comprises of a memory and a processor. The memory stores a decryption system for multi-digit numbers that is operable on the processor. According to an embodiment, the following steps are implemented, when the decryption system for multi-digit numbers is run by the processor:

after receiving a preset type of a multi-digit number to be decrypted, determining a number segment with first preset digits to be decrypted and determining a number segment not to be decrypted other than the number segment to be decrypted, according to rules for determination of predetermined encryption digits;

performing a calculation on the determined number segment not to be decrypted to generate an operational value, by using a predefined decryption cryptographic algorithm and key, corresponding to the multi-digit number to be decrypted;

performing a hybrid decryption operation of the number segment to be decrypted and the operational value generated, by employing a predetermined hybrid decryption algorithm for obtaining a hybrid decrypted number segment with the first preset digits; and replacing the number segment to be decrypted in the preset type of multi-digit number to be decrypted with the hybrid decrypted number segment to generate a decrypted multi-digit number.

Preferably, the predetermined rules for the determination of digits to be decrypted include:

a number of second preset digits on a leftmost side of the multi-digit number to be decrypted is designated as a front number, while a number of third preset digits on a rightmost side of the multi-digit number to be decrypted is designated the back number. The front and back numbers are designated as the number segment not to be decrypted. The sum of the numbers of second and third preset digits is less than the number of digits of the multi-digit number to be decrypted. The remaining number segment is designated as the number segment to be decrypted, after the front and back numbers are removed from the multi-digit number to be decrypted.

Preferably, the predefined decryption cryptographic algorithm includes a hash algorithm and a binary number conversion algorithm. The formula of the hash algorithm is:

$$Hash=Digest(Nl+Nr+K)$$

wherein, K represents a preset key corresponding to the multi-digit number to be decrypted, while Nl represents the number of the second preset digits on the leftmost side of the multi-digit number to be decrypted; Nr represents the number of the third preset digits on the rightmost side of the multi-digit number to be decrypted, and Hash represents a calculated Hash value.

The formula of the binary number conversion algorithm is:

$$Num=CalcNum(Hash)$$

wherein, Num represents the conversion of the calculated Hash value from binary to decimal.

Preferably, the predetermined hybrid decryption algorithm is:

$$Nm=(E\_Nm-Num)\mod 10^n$$

wherein, E_Nm represents the number segment to be decrypted, while Num represents a decimal operational value, n represents a number of digits of the number segment to be decrypted, and Nm represents the calculated hybrid decrypted number segment.

The present invention proposes methods and servers for encryption and decryption for multi-digit numbers. The number segments to be and not to be encrypted in the multi-digit number to be encrypted are determined through the rules for the determination of the predetermined encryption digits. The predefined encryption cryptographic algorithm and key are used to perform a calculation on the determined number segment not to be encrypted to generate an operational value. The predetermined hybrid encryption algorithm is employed for performing a hybrid encryption operation on the number segment to be encrypted and the generated operational value to obtain a hybrid encrypted number segment. The number segment to be encrypted in the multi-digit number to be encrypted is replaced with the hybrid encrypted number segment to generate the encrypted multi-digit number. Since the numbers in the multi-digit number to be encrypted are classified into the number segments to be and not to be encrypted, different encryption algorithms are adopted for performing the encryption operation of the number segments to be and not to be encrypted, respectively. Moreover, the operational result of the number segment not to be encrypted is added to the encryption operation of the number segment to be encrypted. Therefore, the complexity of the encryption operation of the multi-digit number to be encrypted is enhanced, and the confidentiality of the encryption operation does not depend on the confidentiality of the data mapping table. The security of multi-digit numbers is effectively improved.

DETAILED DESCRIPTION OF SPECIFIC EMBODIMENTS

In order to understand the objectives, technical solutions, and advantages of the present invention more clearly, the present invention is further described in detail below in combination with the accompanying figures and embodiments. The detailed description herein should not be taken to limit the invention to the specific embodiments, but are for explanation and understanding only. Embodiments of the present invention, and all other embodiments obtained by one of ordinary skill in the art without creative work, are protected within the scope of the present invention.

It is worth noting that words such as "first" and "second" mentioned in the present invention are used for the sake of description only and should not be interpreted to explicitly or implicitly indicate the relative importance or imply the number or quantity of technical features. Therefore, features referenced with "first" and "second" may explicitly or implicitly include at least one such feature. Moreover, technical solutions in different embodiments may be incorporated with each other, provided that such incorporation may be recognized by those ordinarily skilled in the art. When such incorporation is in conflict or fails to be implemented, it should be considered nonexistent, nor under the protective scope of the present invention.

Figure 1:
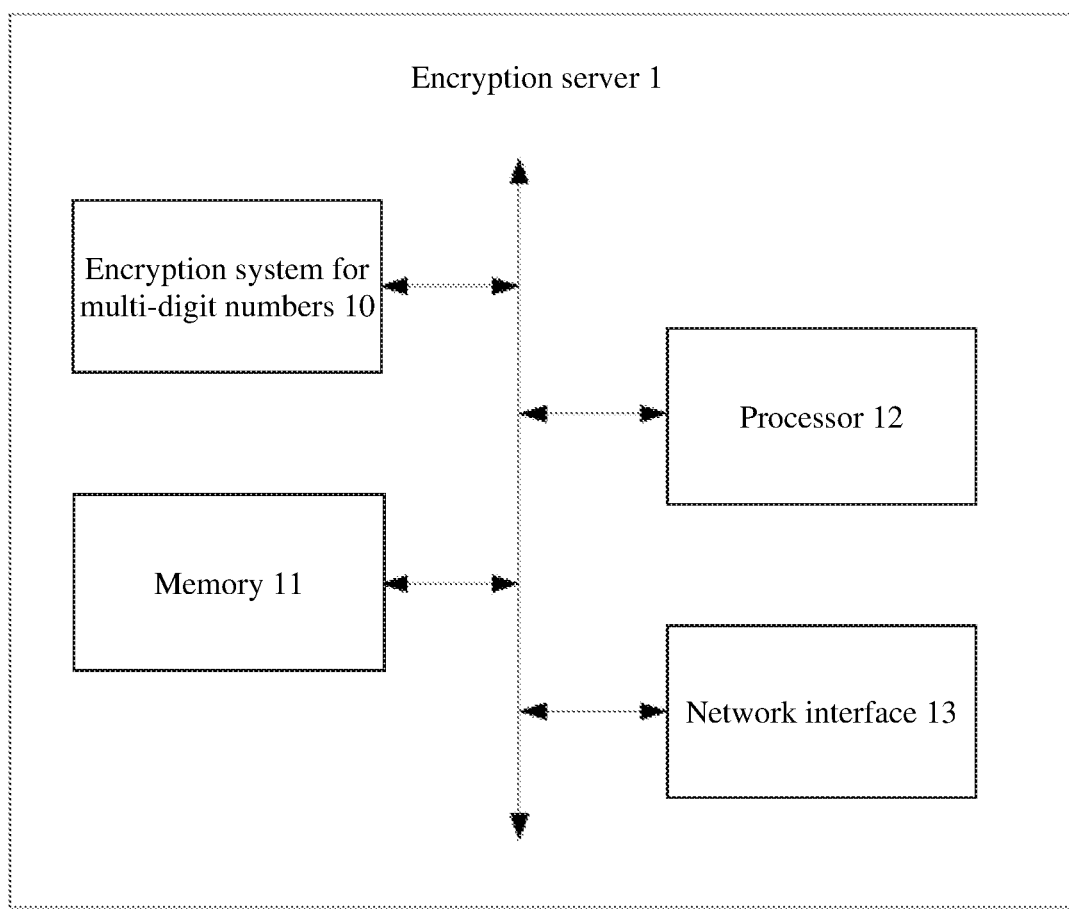
FIG. 1 is a block diagram of an alternative hardware architecture of an encryption server 1 according to an embodiment of the present invention.

Referring to FIG. 1, there is shown a schematic diagram of an alternative hardware architecture of an encryption server 1 according to an embodiment of the present invention.

The encryption server 1 may be a computing device such as a rack-mounted server, a blade server, a tower server, or a cabinet server. The encryption server 1 may be an independent server or a server cluster comprising of several servers.

In the present embodiment, the encryption server 1 includes, but is not limited to, a memory 11, a processor 12, and a network interface 13 that may be communicatively connected to each other via a system bus.

The encryption server 1 is connected to the network through the network interface 13 (not shown in FIG. 1) to acquire information. The network may be wireless and wired networks, such as an Intranet, an Internet, a Global System of Mobile communication (GSM), a Wideband Code Division Multiple Access (WCDMA), a 4G or a 5G network, a Bluetooth, a Wi-Fi network, or a voice network.

It is worth noting that, while FIG. 1 displays the encryption server 1 comprising components 11-13, it should be understood that not all the components displayed must be implemented, but that more or fewer components are acceptable.

The memory 11 includes at least one type of readable storage media. The readable storage media include flash memory, hard disk, multimedia card, cassette memory (e.g. SD or DX memory, etc.), direct access memory (RAM), static direct access memory (SRAM), read-only memory (ROM), electrically erasable and programmable read-only memory (EEPROM), programmable read-only memory (PROM), magnetic memory, magnetic disk, and optical disk, etc. In some embodiments, the memory 11 may be an internal storage unit of the encryption server 1, such as a hard disk or a flash memory of the encryption server 1. In other embodiments, the memory 11 may be an external storage device of the encryption server 1, such as a plug-in hard disk, a smart media card (SMC), a secure digital (SD) card, or a flash card, etc. Certainly, the memory 11 may also include both an internal storage unit and an external storage device of the encryption server 1. In the present embodiment, the memory 11 is generally used to store the operating system and application software installed on the encryption server 1, such as the program code of the encryption system for multi-digit numbers 10. In addition, the memory 11 may be used to temporarily store various types of data that have been output or will be output.

In some embodiments, the processor 12 may be a central processing unit (CPU), a controller, a microcontroller, a microprocessor, or other data processing chip. In general, the processor 12 is configured to control the overall operation of the encryption server 1, such as the control and processing related to data interaction or communication. In the present embodiment, the processor 12 is configured to run the program code or process data stored in the memory 11, for example, to run the encryption system for multi-digit numbers 10.

The network interface 13 may include a wireless or wired network interface. The network interface 13 is generally used to establish communication connection between the encryption server 1 and other electronic devices.

The encryption system for multi-digit numbers 10 includes at least one computer readable instruction stored in the memory 11 which can be executed by the processor 12 to implement embodiments of the present invention.

The following steps are implemented, when the encryption system for multi-digit numbers 10 described above is executed by the processor 12:

Step S1: After receiving a multi-digit number in the preset type to be encrypted (e.g. the mobile number of "13424174205"), in accordance with rules for determining predetermined encryption digits, determining the number segment of the first preset digits to be encrypted (for example, the four digits, "2417", in the middle of the mobile number are represented by Nm) and determining the number segment not to be encrypted other than (i.e. excluding or except) the number segment to be encrypted (the three digits on the leftmost side of the mobile number are represented by Nl, while the four digits on the rightmost side, Nr).

Step S2: Using a predefined encryption cryptographic algorithm and key, corresponding to the multi-digit number to be encrypted, to perform a calculation on the determined number segment not to be encrypted to generate an operational value. For example, the predefined encryption cryptographic algorithm includes a hash algorithm and a binary number conversion algorithm. The formula of the hash algorithm is expressed as "Hash=Digest (Nl+Nr+K)", wherein K represents the key; Nl represents the number of second preset digits on the left most side of the multi-digit number to be encrypted; Nr represents the number of third preset digits on the rightmost side of the multi-digit number to be encrypted; and Hash represents a Hash value. The binary number conversion algorithm converts the binary Hash value to a decimal operational value. The formula of the binary number conversion algorithm is expressed as "Num=CalcNum (Hash)". For example, the last obtained decimal number 9 is deemed as the operational value.

Step S3: Performing a hybrid encryption operation on the number segment to be encrypted and the generated operational value by employing a predetermined hybrid encryption algorithm to obtain a hybrid encrypted number segment of the first preset digits. For example, the hybrid encryption algorithm may be used to add the operational value obtained in step S2 to the number segment of the first preset digits to be encrypted. A modulo operation is then performed on the obtained sum. The formula of the hybrid algorithm is expressed as $E\_Nm=(Nm+Num) \bmod 10^n$, wherein Nm represents the number segment to be encrypted, while Num represents the operational value; and n is equal to the number of digits of the number segment to be encrypted. For example, $E\_Nm=(2417+9) \bmod 10^4=2426$. The modulo operation is defined as follows: when $a=bq+r$, wherein q is an integer and q has a maximum value, a mod $b=r$, wherein r is a non-negative number.

Step S4: Replacing the number segment to be encrypted in the preset type of multi-digit number to be encrypted with the hybrid encrypted number segment, and generating an encrypted multi-digit number. For example, Nl+E_Nm+Nr, where Nl represents the number of the second preset digits on the far left of the multi-digit number to be encrypted, while Nr represents the number of the third preset digits on the far right of the multi-digit number to be encrypted; and E_Nm represents the hybrid encrypted number segment.

Compared with current technology, according to the present embodiment, the number segment to be and the number segment not to be encrypted in the multi-digit number to be encrypted are determined through the rules for a determination of the predetermined encryption digits. The predefined encryption cryptographic algorithm and key are used to perform a calculation on the determined number segment not to be encrypted to generate an operational value. The predetermined hybrid encryption algorithm is employed for performing a hybrid encryption operation on the number segment to be encrypted and the generated operational value, to obtain the hybrid encrypted number segment. The number segment to be encrypted in the multi-digit number to be encrypted is replaced with the hybrid encrypted number segment to generate the encrypted multi-digit number. Since the numbers in the multi-digit number to be encrypted are classified into the number segments to be and not to be encrypted, different encryption algorithms are adopted for performing the encryption operation of the number segments to be and not to be encrypted; and the operational result of the number segment not to be encrypted is added to the encryption operation of the number segment to be encrypted. Therefore, the complexity of the encryption operation of the multi-digit number to be encrypted is enhanced, and the confidentiality of the encryption operation is not dependent on the confidentiality of the data mapping table. The security of multi-digit numbers is effectively reinforced. Furthermore, the present embodiment does not destroy the availability of the multi-digit number and the digital sequence is kept intact. In the present embodiment, the encryption of the multi-digit number does not require great changes to the corresponding system, database, or business procedures; the implementation difficulty is low, in other words, the implementation is easy.

In another embodiment, based on the embodiment of FIG. 1 above, when the encryption system for multi-digit numbers 10 is executed by the processor 12, the method further comprises the following steps:

generating an encryption identifier for the encrypted multi-digit number by following predetermined rules for number encryption identifiers. The predetermined rules for number encryption identifiers include:

in line with the meaning of the multi-digit number, several numbers with preset digits in the encrypted multi-digit number generated is converted to the encryption identifier corresponding to the type of the multi-digit number to be encrypted. For example, generally, the first digit of a mobile number in mainland China is 1. The digit on the left most side of the encrypted mobile number, "1", can be changed to the encryption identifier, "9". As another example, the ID card number of a citizen of mainland China includes the year of birth. The two digits on the left most side of the encrypted ID card number can be changed into an encryption identifier, the "19" is converted to "89", while the "20" to "90".

In another embodiment, when the encryption system for multi-digit numbers 10 is executed by the processor 12, the rules for the determination of the predetermined encryption digits include:

the number of the second preset digits (e.g. the leftmost three digits) on the leftmost side of the multi-digit number to be encrypted (e.g. the mobile number of "13424174205") is deemed as the front number Nl, while the number of the third preset digits (e.g. the rightmost four digits) on the rightmost side of the multi-digit number to be encrypted, is designated the back number Nr. The front number Nl and back number Nr are deemed as the number segment not to be encrypted. The sum of the numbers of second and third preset digits is less than the number of digits of the multi-digit number. The remaining number segment Nm is deemed as the number segment to be encrypted (e.g. "2417"), after the front and back numbers are removed from the multi-digit number to be encrypted.

In another embodiment, when the encryption system for multi-digit numbers 10 is executed by the processor 12, the predefined encryption cryptographic algorithm includes a hash algorithm and a binary number conversion algorithm.

The formula of the hash algorithm is expressed as Hash=Digest (Nl+Nr+K), wherein K represents the preset key corresponding to the multi-digit number to be encrypted (all the preset types of multi-digit numbers to be encrypted can correspond to a uniform key), while Nl represents the number of the second preset digits on the leftmost side of the multi-digit number to be encrypted; Nr represents the number of the third preset digits on the rightmost side of the multi-digit number to be encrypted; and Hash represents the Hash value.

The binary number conversion algorithm converts the binary Hash value to a decimal operational value. The formula of the binary number conversion algorithm is expressed as Num=CalcNum (Hash), wherein Hash represents the Hash value calculated with the above-mentioned hash algorithm.

Furthermore, the hybrid encryption algorithm may be used to add the calculated decimal operational value to the number segment of the first preset digits to be encrypted; and then, a modulo operation is performed on the obtained sum. The formula of the hybrid encryption algorithm is expressed as:

$$E\_Nm = (Nm + Num) \mod 10^n$$

wherein Nm represents the number segment to be encrypted, while Num represents the operational value; n is equal to the number of digits of the number segment to be encrypted; and E_Nm represents the calculated hybrid encrypted number segment.

Specifically, in the present embodiment, a predefined cryptographic algorithm and key, K, are used to process Nl and Nr. For example, a hash algorithm is used as follows: Hash=Digest (Nl+Nr+K). The digest algorithm (Digest) may be MD5, SHA-1, SHA-2 or other algorithms. The generated Hash value is calculated by using a suitable algorithm to calculate a decimal value. The formula is expressed as Num=CalcNum (Hash). The CalcNum algorithm is used to convert the binary Hash value into the decimal value. For example, an XOR operation is performed according to bytes on the binary Hash value from low to high digits, and the result is then converted to a decimal representation. For example, Hash is expressed as Byte_n, . . . B_3, B_2, B_1, B_0 by byte. Num=CalcNum (Hash)=B_0⊕B_1⊕B_2⊕B_3⊕ . . . ⊕Byte_n (⊕ is the XOR operation).

Figure 2:
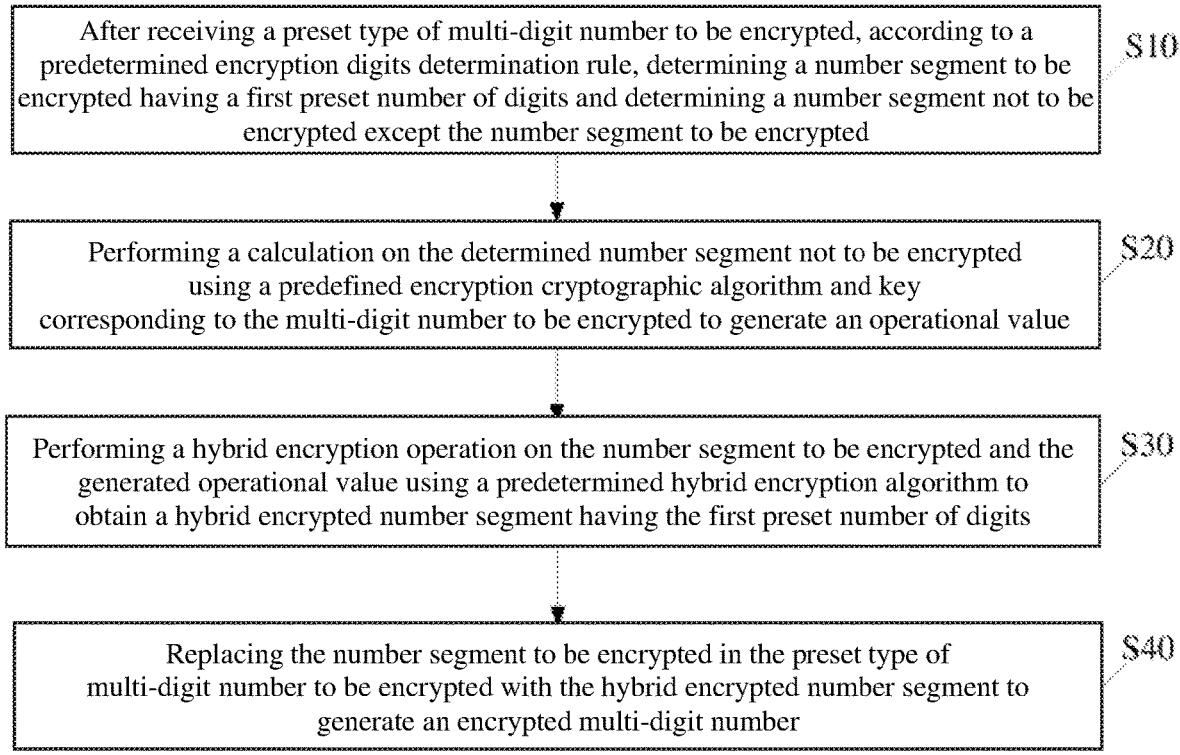
FIG. 2 is a flowchart illustrating an encryption method for multi-digit numbers according to an embodiment of the present invention.

FIG. 2 shows a flow diagram of an embodiment of an encryption method for multi-digit numbers of the present invention. The method for encryption of multi-digit numbers comprises the following steps:

Step S10: After receiving a multi-digit number in the preset type to be encrypted (e.g. the mobile number of "13424174205"), in accordance with rules for determining the predetermined encryption digits, determining the number segment of the first preset digits to be encrypted (e.g. the four digits, "2417", in the middle of the mobile number are represented by Nm) and determining the number segment not to be encrypted (the leftmost three digits of the mobile number are represented by Nl, while the rightmost four digits, Nr).

Step S20: Using a predefined encryption cryptographic algorithm and key, corresponding to the multi-digit number to be encrypted, to perform a calculation on the determined number segment not to be encrypted to generate an operational value. For example, the predefined encryption cryptographic algorithm includes a hash algorithm and a binary number conversion algorithm. The formula of the hash algorithm is "Hash=Digest (Nl+Nr+K)", wherein K represents the key; Nl represents the number of the second preset digits on the leftmost side of the multi-digit number to be encrypted; Nr represents the number of the third preset digits on the rightmost side of the multi-digit number to be encrypted; and Hash represents a Hash value. The binary number conversion algorithm converts the binary Hash value to a decimal operational value. The formula of the binary number conversion algorithm is expressed as "Num=CalcNum (Hash)". For example, the last obtained decimal number 9 is deemed as the operational value.

Step S30: Performing a hybrid encryption operation on the number segment to be encrypted and the generated operational value by employing a predetermined hybrid encryption algorithm to obtain a hybrid encrypted number segment of the first preset digits. For example, the hybrid encryption algorithm may be used to add the operational value obtained in step S20 to the number segment of the first preset digits to be encrypted. Then, a modulo operation is performed on the obtained sum. The formula of the hybrid algorithm is expressed as $E\_Nm=(Nm+Num) \mod 10^n$, wherein Nm represents the number segment to be encrypted, while Num represents the operational value; and n is equal to the number of digits of the number segment to be encrypted. For example, $E\_Nm=(2417+9) \mod 10^4=2426$. The modulo operation is defined as follows: when $a=bq+r$, wherein q is an integer and q has a maximum value, a mod $b=r$, wherein r is a non-negative number.

Step S40: Replacing the number segment to be encrypted in the preset type of multi-digit number to be encrypted with the hybrid encrypted number segment to generate an encrypted multi-digit number. For example, Nl+E_Nm+Nr, where Nl represents the number of the second preset digits on the leftmost side of the multi-digit number to be encrypted, while Nr represents the number of the third preset digits on the rightmost side of the multi-digit number to be encrypted; and E_Nm represents the hybrid encrypted number segment.

Compared with current technology, according to the present embodiment, the number segment to be and the number segment not to be encrypted in the multi-digit number to be encrypted are determined through the rules for a determination of the predetermined encryption digits. The predefined encryption cryptographic algorithm and key are used to perform a calculation on the determined number segment not to be encrypted to generate an operational value. The predetermined hybrid encryption algorithm is employed for performing a hybrid encryption operation of the number segment to be encrypted and the generated operational value, to obtain the hybrid encrypted number segment. The number segment to be encrypted in the multi-digit number to be encrypted is replaced with the hybrid encrypted number segment to generate the encrypted multi-digit number. Since the numbers in the multi-digit number to be encrypted are classified into the number segments to be and not to be encrypted, different encryption algorithms are adopted for performing the encryption operation of the number segments to be and not to be encrypted; and the operational result of the number segment not to be encrypted is added to the encryption operation of the number segment to be encrypted. Therefore, the complexity of the encryption operation of the multi-digit number to be encrypted is enhanced, and the confidentiality of the encryption operation is not dependent on the confidentiality of the data mapping table. The security of multi-digit numbers is effectively reinforced. Furthermore, the present embodiment does not destroy the availability of the multi-digit number and the digital sequence is kept intact. In the present embodiment, the encryption of the multi-digit number does not require great changes to the corresponding system, database, or business procedures. The implementation difficulty is low, in other words, the implementation is easy.

In another embodiment, the method further comprises the following steps:

in accordance with predetermined rules for number encryption identifiers, an encryption identifier is generated for the encrypted multi-digit number. The predetermined rules for number encryption identifiers include:

in line with the meaning of the multi-digit number, several numbers with preset digits in the encrypted multi-digit number generated is converted to the encryption identifier corresponding to the type of the multi-digit number to be encrypted. For example, generally, the first digit of a mobile number in mainland China is 1. The digit on the left most side of the encrypted mobile number, "1", can be changed to the encryption identifier, "9". As another example, the ID card number of a citizen of mainland China includes the year of birth. The two digits on the left most side of the encrypted ID card number can be changed into an encryption identifier, the "19" is converted to "89", while the "20" to "90".

Therefore, after a multi-digit number of a preset type is received, a preset position of the received multi-digit number (for example, the preset position may be at the first digit on the left most side of the multi-digit number) can be analyzed as to whether it contains the encryption identifier corresponding to the number type of the multi-digit number. If so, it can be confirmed that the multi-digit number in the preset type is a multi-digit number to be decrypted; if not, it can be confirmed that the multi-digit number in the preset type is a multi-digit number to be encrypted.

In another embodiment, the rules for the determination of the predetermined encryption digits include:

the number of the second preset digits (e.g. the leftmost three digits) on the leftmost side of the multi-digit number to be encrypted (e.g. the mobile number of "13424174205") is deemed as the front number Nl, while the number of the third preset digits (e.g. the rightmost four digits) on the rightmost side of the multi-digit number to be encrypted is designated the back number Nr. The front number Nl and the back number Nr are deemed as the number segment not to be encrypted. The sum of the numbers of the second and third preset digits is less than the number of digits of the multi-digit number. The remaining number segment Nm is deemed as the number segment to be encrypted (e.g. "2417"), after the front and back numbers are removed from the multi-digit number to be encrypted.

In another embodiment, the predefined encryption cryptographic algorithm comprises a hash algorithm and a binary number conversion algorithm.

The formula of the hash algorithm is expressed as Hash=Digest (Nl+Nr+K), wherein K represents the preset key corresponding to the multi-digit number to be encrypted (all the preset types of multi-digit numbers to be encrypted can correspond to a uniform key), while Nl represents the number of the second preset digits on the leftmost side of the multi-digit number to be encrypted; Nr represents the number of the third preset digits on the rightmost side of the multi-digit number to be encrypted; and Hash represents the Hash value.

The binary number conversion algorithm converts the binary Hash value to a decimal operational value. The formula of the binary number conversion algorithm is expressed as Num=CalcNum (Hash), wherein Hash represents the Hash value calculated with the above-mentioned hash algorithm.

Furthermore, the hybrid encryption algorithm is used to add the calculated decimal operational value to the number segment of the first preset digits to be encrypted; and then, a modulo operation is performed on the sum. The formula of the hybrid encryption algorithm is:

$$E\_Nm=(Nm+Num) \bmod 10^n$$

wherein Nm represents the number segment to be encrypted, Num represents the operational value, n is equal to the number of digits of the number segment to be encrypted; and E_Nm represents the calculated hybrid encrypted number segment.

Specifically, in the present embodiment, a predefined cryptographic algorithm and key, K, are used to process Nl and Nr. For example, a hash algorithm is used as follows: Hash=Digest (Nl+Nr+K). The digest algorithm (Digest) may be MD5, SHA-1, SHA-2 or other algorithms. The generated Hash value is calculated by using a suitable algorithm to calculate the decimal value. The formula for calculating the decimal value based on the generated Hash value is expressed as Num=CalcNum (Hash). The CalcNum algorithm is used to convert the binary Hash value into the decimal value. For example, an XOR operation is performed according to bytes on the binary Hash value from low to high digits, and the result is then converted into a decimal representation. For example, Hash is expressed as Byte_n, . . . B_3, B_2, B_1, B_0 by byte. Num=CalcNum (Hash)=B_0⊕B_1⊕B_2⊕B_3⊕ . . . ⊕Byte_n⊕ is the XOR operation).

Additionally, the present invention provides a computer readable storage medium. The computer readable storage medium stores the encryption system for multi-digit numbers. The encryption system for multi-digit numbers can be executed by at least one processor to cause the at least one processor to perform the steps of the encryption method for multi-digit numbers in the above embodiment. The specific implementation of process steps S10, S20, and S30 of the encryption method for multi-digit numbers has been described above, and need not be repeated here.

Figure 3:
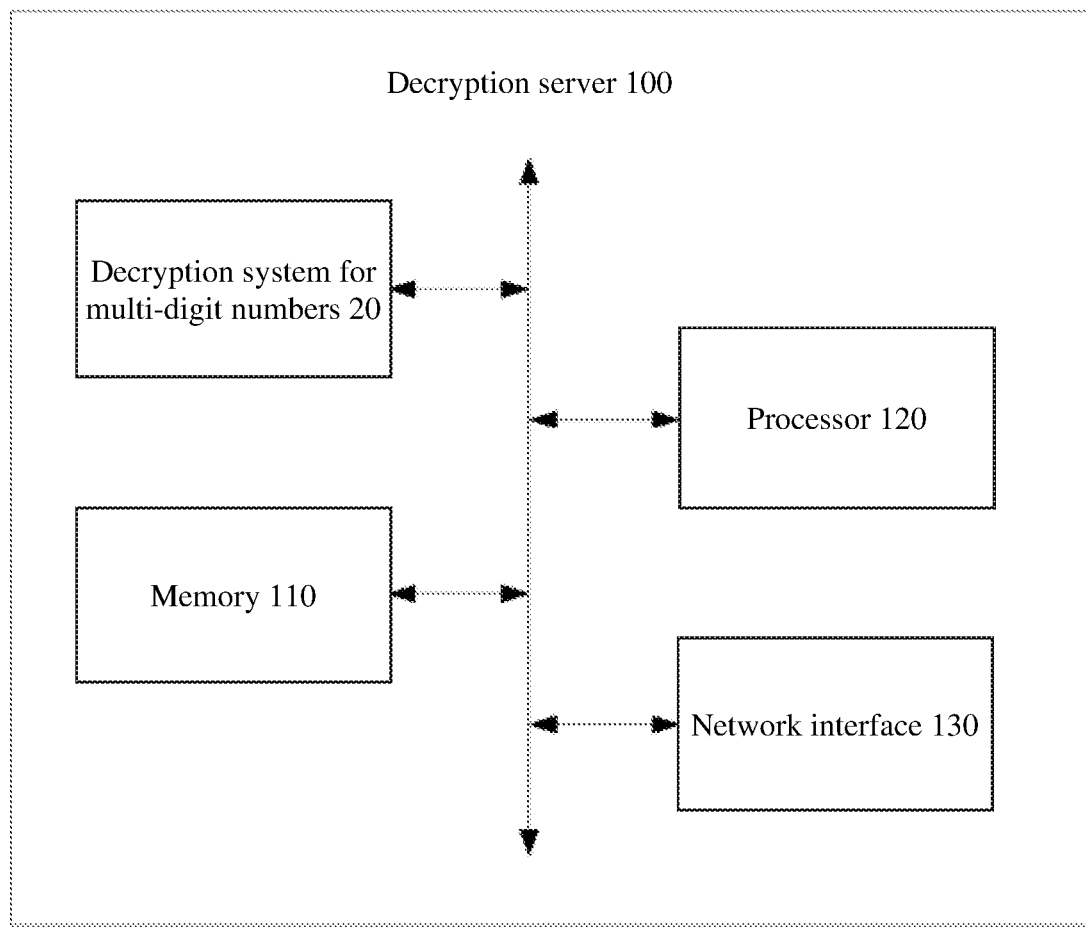
FIG. 3 is a block diagram of an alternative hardware architecture of a decryption server 100 according to an embodiment of the present invention.

Referring to FIG. 3, a schematic diagram of an alternative hardware architecture of the decryption server 100 is shown, according to an embodiment of the present invention.

The decryption server 100 can be a computing device such as a rack-mounted server, a blade server, a tower server, or a cabinet server. The decryption server 1 can be an independent server or a server cluster comprising of several servers.

In the present embodiment, the decryption server 100 includes, but is not limited to, a memory 110, a processor 120, and a network interface 130 that may be communicatively coupled to each other via a system bus.

The decryption server 100 is connected to the network through the network interface 130 (not shown in FIG. 3) to acquire information. The network may be wireless and wired networks, such as an Intranet, an Internet, a Global System of Mobile communication (GSM), a Wideband Code Division Multiple Access (WCDMA), a 4G or a 5G network, a Bluetooth, a Wi-Fi network, or a voice network.

It is worth noting that, while FIG. 3 displays the decryption server 100 comprising components 110-130, it should be understood that not all the components displayed must be implemented, but that more or fewer components are acceptable.

The memory 110 includes at least one type of readable storage media. The readable storage media include flash memory, hard disk, multimedia card, cassette memory (e.g. SD or DX memory, etc.), direct access memory (RAM), static direct access memory (SRAM), read-only memory (ROM), electrically erasable and programmable read-only memory (EEPROM), programmable read-only memory (PROM), magnetic memory, magnetic disk, and optical disk. In some embodiments, the memory 110 may be an internal storage unit of the decryption server 100, such as a hard disk or a flash memory of the decryption server 100. In other embodiments, the memory 110 may be an external storage device of the decryption server 100, such as a plug-in hard disk, a smart media card (SMC), a secure digital (SD) card, or a flash card, etc. Certainly, the memory 110 may also include both an internal storage unit and an external storage device of the decryption server 100. In the present embodiment, the memory 110 is generally used to store the operating system and application software installed on the decryption server 100, such as the program code of the decryption system 20 for multi-digit numbers. In addition, the memory 110 may be used to temporarily store various types of data that have been output or will be output.

In some embodiments, the processor 120 may be a central processing unit (CPU), a controller, a microcontroller, a microprocessor, or other data processing chip. In general, the processor 120 is configured to control the overall operation of the decryption server 100, such as the control and processing related to data interaction or communication. In the present embodiment, the processor 120 is configured to run the program code or process data stored in the memory 110, for example, to run the decryption system for multi-digit numbers 20.

The network interface 130 may include a wireless or wired network interface. Generally, the network interface 130 is used to establish communication connection between the decryption server 100 and other electronic devices.

The decryption system for multi-digit numbers 20 comprises at least one computer readable instruction stored in the memory 110 which can be executed by the processor 120 to implement embodiments of the present invention.

The following steps are implemented, when the decryption system for multi-digit numbers 20 described above is executed by the processor 120:

Step B1: After receiving a preset type of multi-digit number to be decrypted (e.g. the mobile number to be decrypted is "93424264205"), in accordance with rules for determining predetermined decryption digits, determining a number segment of first preset digits to be decrypted (e.g. the four digits, "2426", in the middle of the mobile number to be decrypted are represented by E_Nm) and determining a number segment not to be decrypted other than the number segment to be decrypted (the three digits on the leftmost side of the mobile number to be decrypted are represented by Nl, while the four digits on the rightmost side, Nr). If an encryption flag bit is set for the number segment not to be decrypted, the encryption flag bit shall be recovered before the number segment not to be decrypted is obtained.

Step B2: Using a predefined decryption cryptographic algorithm and key, corresponding to the multi-digit number to be decrypted, {for example, the predefined decryption cryptographic algorithm includes a hash algorithm and a binary number conversion algorithm. The formula of such hash algorithm is expressed as "Hash=Digest (Nl+Nr+K)", wherein K represents a key, while Nl represents the number of the second preset digits on the leftmost side of the multi-digit number to be decrypted; Nr represents a number of the third preset digits on the rightmost side of the multi-digit number to be decrypted; and Hash represents a Hash value. The binary number conversion algorithm converts the binary Hash value to a decimal operational value. The formula of the binary number conversion algorithm is expressed as "Num=CalcNum (Hash)"}, for performing a calculation on the determined number segment not to be decrypted to generate an operational value (e.g. the decimal number of 9).

Step B3: Applying a predetermined hybrid decryption algorithm {for example, the hybrid decryption algorithm may be used to subtract the operational value obtained in step B2 from the number segment of the first preset digits to be decrypted. Then, a modulo operation is performed on the obtained difference, i.e. "a mod operation". The formula of the hybrid algorithm is expressed as $Nm=(E\_Nm-Num) \mod 10^n$, wherein E_Nm represents the number segment to be decrypted, while Num represents the operational value; and n is equal to the number of digits of the number segment to be decrypted. The modulo operation is defined as follows: when $a=bq+r$, wherein q is an integer and q is maximized, $a \mod b=r$, wherein r is a non-negative number}, for performing a hybrid decryption operation on the number segment to be decrypted and the generated operational value to obtain a hybrid decrypted number segment of the first preset digits Nm {for example, $E\_Nm=(2426-9) \mod 10^4=2417$}.

Step B4: Replacing the number segment to be decrypted in the preset type of multi-digit number to be decrypted with the hybrid decrypted number segment and generating a decrypted multi-digit number {e.g. "13424174205"}.

In an embodiment, when the decryption system for multi-digit numbers 20 is run by the processor 120, the rules for the determination of the predetermined decryption digits comprise:

a number of second preset digits (e.g. the leftmost three digits) on the leftmost side of the multi-digit number to be decrypted (e.g. the mobile number of "13424264205") is deemed as the front number Nl, while a number of third preset digits (e.g. the rightmost four digits) on the rightmost side of the multi-digit number to be decrypted is designated the back number Nr. The front number Nl and the back number Nr are deemed as the number segments not to be decrypted. The sum of the numbers of second and third preset digits is less than the number of digits of the multi-digit number.

After the front number and back number are removed from the multi-digit number to be decrypted, the remaining number segment E_Nm is designated as the number segment to be decrypted (e.g. "2426").

In another embodiment, when the decryption system for multi-digit numbers 20 is executed by the processor 120, the predefined decryption cryptographic algorithm includes a hash algorithm and a binary number conversion algorithm.

The formula of the hash algorithm is expressed as Hash=Digest (Nl+Nr+K), wherein K represents the preset key corresponding to the multi-digit number to be decrypted (for all the preset types of multi-digit numbers to be decrypted, the corresponding key can be unified), while Nl represents the number of the second preset digits on the leftmost side of the multi-digit number to be decrypted; Nr represents the number of the third preset digits on the rightmost side of the multi-digit number to be decrypted; and Hash represents the Hash value.

The binary number conversion algorithm converts the binary Hash value to a decimal operational value. The formula of the binary number conversion algorithm is expressed as Num=CalcNum (Hash), wherein Hash represents the Hash value calculated with the hash algorithm.

Furthermore, the hybrid decryption algorithm may be used to subtract the calculated decimal operational value from the number segment of the first preset digits to be decrypted; and then, a modulo operation is performed on the obtained difference. The formula of the hybrid decryption algorithm is expressed as:

$$Nm=(E\_Nm-Num) \mod 10^n$$

wherein E_Nm represents the number segment to be decrypted, Num represents the operational value, n is equal to the number of digits of the number segment to be decrypted; and Nm represents the calculated hybrid decrypted number segment.

Specifically, in the present embodiment, a predefined cryptographic algorithm and key, K, are used to process Nl and Nr. For example, a hash algorithm is used: Hash=Digest (Nl+Nr+K). The digest algorithm (Digest) may be MD5, SHA-1, SHA-2 or other algorithms. The generated Hash value is calculated by using a suitable algorithm to calculate a decimal value. The formula for calculating the decimal value based on the generated Hash value is expressed as Num=CalcNum (Hash). The CalcNum algorithm is used to convert the binary Hash value into the decimal value. For example, an XOR operation is performed according to bytes on the binary Hash value from low to high digits, and the result is then converted into a decimal representation. For example, Hash is expressed as $Byte\_n, \ldots B\_3, B\_2, B\_1, B\_0$ by byte. $Num=CalcNum(Hash)=B\_0 \oplus B\_1 \oplus B\_2 \oplus B\_3 \oplus \ldots \oplus Byte\_n$ ($\oplus$ is the XOR operation).

Figure 4:
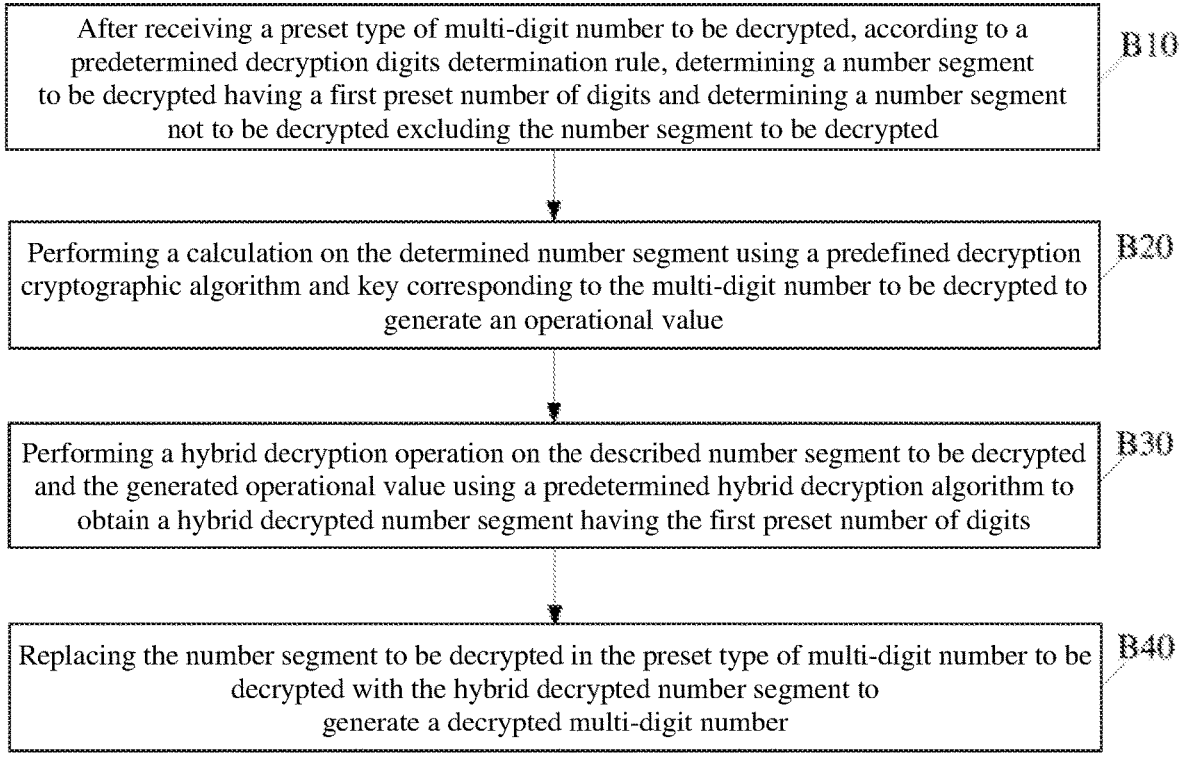
FIG. 4 is a flowchart illustrating a decryption method for multi-digit numbers according to an embodiment of the present invention.

FIG. 4 shows a flowchart of an embodiment of a decryption method for multi-digit numbers of the present invention. The decryption method of multi-digit numbers comprises the following steps:

Step B10: After receiving a preset type of multi-digit number to be decrypted (e.g. the mobile number to be decrypted is "93424264205"), in accordance with rules for determining predetermined decryption digits, determining a number segment of first preset digits to be decrypted (e.g. the four digits, "2426", in the middle of the mobile number to be decrypted are represented by E_Nm), and determining a number segment not to be decrypted of other than the number segment to be decrypted (e.g. the leftmost three digits of the mobile number to be decrypted are represented by Nl, while the rightmost four digits, Nr). If an encryption flag bit is set for the number segment not to be decrypted, the encryption flag bit shall be recovered before the number segment not to be decrypted is obtained.

Step B20: Using a predefined decryption cryptographic algorithm and key, corresponding to the multi-digit number to be decrypted, for example, the predefined cryptographic algorithm includes a hash algorithm and a binary number conversion algorithm. The formula of such hash algorithm is expressed as "Hash=Digest (Nl+Nr+K)", wherein K represents a key, while Nl represents a number of the second preset digits on the leftmost side of the multi-digit number to be decrypted; Nr represents a number of the third preset digits on the rightmost side of the multi-digit number to be decrypted; and Hash represents a Hash value. The binary number conversion algorithm converts the binary Hash value to a decimal operational value. The formula of the binary number conversion algorithm is expressed as "Num=CalcNum (Hash)"}, for performing a calculation on the determined number segment not to be decrypted to generate an operational value (e.g. the decimal number of 9).

Step B30: Applying a predetermined hybrid decryption algorithm {for example, the hybrid decryption algorithm may be used to subtract the operational value obtained in step B20 from the number segment of the first preset digits to be decrypted. Then, a modulo operation is performed on the obtained difference, i.e. "a mod operation". The formula of the hybrid algorithm is expressed as Nm=(E_Nm−Num) mod10$^n$, wherein E_Nm represents the number segment to be decrypted, while Num represents the operational value; and n is equal to the number of digits of the number segment to be decrypted. The modulo operation is defined as follows: when a=bq+r, wherein q is an integer and q is maximized, a mod b=r, wherein r is a non-negative number}, for performing a hybrid decryption operation on the number segment to be decrypted and the generated operational value to obtain a hybrid decrypted number segment of the first preset digits Nm {for example, E_Nm=(2426-9) mod10$^4$=24171.

Step B40: Replacing he number segment to be decrypted in the preset type of multi-digit number to be decrypted with the hybrid decrypted number segment and generating a decrypted multi-digit number {e.g. "13424174205" }.

In another embodiment, the rules for the determination of the predetermined decryption digits include:

a number of second preset digits (e.g. the leftmost three digits) on the leftmost side of the multi-digit number to be decrypted (e.g. the mobile number of "13424264205") is designated as the front number Nl, while a number of third preset digits (e.g. the rightmost four digits) on the rightmost side of the multi-digit number to be decrypted is designated the back number Nr. The front number Nl and the back number Nr are designated as the number segments not to be decrypted. The sum of the numbers of second and third preset digits is less than the number of digits of the multi-digit number.

After the front number and the back number are removed from the multi-digit number to be decrypted, the remaining number segment E_Nm is the number segment to be decrypted (e.g. "2426").

In another embodiment, the predefined decryption cryptographic algorithm includes a hash algorithm and a binary number conversion algorithm.

The formula of the hash algorithm is expressed as Hash=Digest (Nl+Nr+K), wherein K represents the preset key corresponding to the multi-digit number to be decrypted (for all preset types of multi-digit numbers to be decrypted, the correspond key can be unified), while Nl represents the number of the second preset digits on the leftmost side of the multi-digit number to be decrypted; Nr represents the number of the third preset digits on the rightmost side of the multi-digit number to be decrypted; and Hash represents the Hash value.

The binary number conversion algorithm converts the binary Hash value to a decimal operational value. The formula of the binary number conversion algorithm is expressed as Num=CalcNum (Hash), wherein Hash represents the Hash value calculated with the hash algorithm.

Furthermore, the hybrid decryption algorithm may be used to subtract the calculated decimal operational value from the number segment of the first preset digits to be decrypted; and then, a modulo operation is performed on the obtained difference. The formula of the hybrid decryption algorithm is expressed as:

$$Nm=(E\_Nm-Num) \bmod 10^n$$

wherein E_Nm represents the number segment to be decrypted, while Num represents the operational value, n is equal to the number of digits of the number segment to be decrypted; and Nm represents the calculated hybrid decrypted number segment.

Specifically, in the present embodiment, the predefined cryptographic algorithm and key, K, are used to process Nl and Nr. For example, a hash algorithm is used: Hash=Digest (Nl+Nr+K). The digest algorithm (Digest) may be MD5, SHA-1, SHA-2 or other algorithms. The generated Hash value is calculated by using a suitable algorithm to calculate a decimal value. The formula for calculating the decimal value based on the generated Hash value is expressed as Num=CalcNum (Hash). The CalcNum algorithm is used to convert the binary Hash value into the decimal value For example, an XOR operation is performed according to bytes on the binary Hash value from low to high digits, and the result is then converted into a decimal representation. For example, Hash is expressed as Byte_n, . . . B_3, B_2, B_1, B_0 by byte. Num=CalcNum (Hash)=B_0⊕B_1⊕B_2⊕B_3⊕ . . . ⊕Byte_n (⊕ is the XOR operation).

Additionally, the present invention provides a computer readable storage medium. The computer readable storage medium stores the decryption system for multi-digit numbers. The decryption system for multi-digit numbers can be executed by at least one processor to cause the at least one processor to perform the steps of the decryption method for multi-digit numbers in the above embodiment. The detailed implementation of process steps B10, B20, and B30 of the decryption method for multi-digit numbers has been described above and will not be repeated here.

It should be noted that terms such as "include", "comprise" or any other variation thereof, are intended to cover non-exclusive inclusions such that a process, method, article or device that comprises a series of elements includes not only those elements but also includes other elements not specified, or includes elements inherent to such process, method, article, or device. In the absence of further restrictions, an element defined by the terms of "including one . . . " does not exclude the presence of other identical elements in the process, method, article, or device that includes the element.

As will be apparent to those skilled in the art from the foregoing description of the embodiments of the present invention, the aforesaid embodiments may be implemented with software and necessary universal (general-purpose) hardware platforms, or implemented in hardware, although the former may be the more preferred embodiment in many cases. Based on such understanding, technical solutions of the present invention in essence, or those parts that contribute to existing technologies, may be embodied in the form of software products. Such computer software products are stored in a storage medium (e.g. ROM/RAM, magnetic disk, or optical disk) that includes instructions to cause a terminal device (e.g. mobile phones, computers, servers, air-conditioners, or network devices, etc.) to perform the computer-implemented methods described in various embodiments of the present invention.

Exemplary embodiments of the present invention are described above with reference to the drawings, which by no means restrict the scope of rights of the present invention. The sequential numbering of the above embodiments of the present invention are for the sake of description and do not indicate any ranking of advantages of the embodiments. Moreover, although a logical sequence is shown in flowcharts, in some circumstances, the steps shown or described may be implemented in a different order than that shown.

Those skilled in the art may implement the present invention through a number of variations, without departing from the scope and essence of the present invention. For example, features of one embodiment may be applied to another embodiment to yield a further embodiment. Any revision, equivalent substitution, and improvement made within the technical conception of the present invention shall be within the scope of rights of the present invention.

What is claimed is:

1. An encryption method for multi-digit numbers, applied to an encryption server, wherein the encryption method comprising:
    after receiving a preset-type of a multi-digit number to be encrypted, determining a number segment to be encrypted having first preset digits and determining a number segment not to be encrypted other than the number segment to be encrypted, according to rules for determination of predetermined encryption digits;
    performing a calculation on the determined number segment not to be encrypted to generate an operational value, by using a predefined encryption cryptographic algorithm and key, the key corresponding to the multi-digit number to be encrypted;
    performing a hybrid encryption operation on the number segment to be encrypted and the operational value generated, by employing a predetermined hybrid encryption algorithm for obtaining a hybrid encrypted number segment having the first preset digits; and
    replacing the number segment to be encrypted in the preset-type of multi-digit number to be encrypted with the hybrid encrypted number segment to generate an encrypted multi-digit number;
wherein the rules for the determination of the predetermined encryption digits comprise:
    a second preset digits number on a leftmost side of the multi-digit number to be encrypted is designated a front number, while a third preset digits number on a rightmost side of the multi-digit number to be encrypted is designated a back number; the front and back numbers are designated as the number segment not to be encrypted, wherein, a sum of a number of digits of the second preset digits number and a number of digits of the third preset digits number is less than a number of digits of the multi-digit number to be encrypted; and after removing the front and back numbers from the multi-digit number to be encrypted, a remaining number segment is designated as the number segment to be encrypted.

2. The encryption method for multi-digit numbers according to claim 1, wherein after replacing the number segment to be encrypted in the preset type of multi-digit number to be encrypted with the hybrid encrypted number segment to generate the encrypted multi-digit number, the method further comprising:
    generating an encryption identifier for the encrypted multi-digit number according to predetermined rules for number encryption identifiers; wherein the predetermined rules for number encryption identifiers comprise:
    in line with a meaning of the multi-digit number, converting one or more numbers with preset digits in the encrypted multi-digit number generated, into an encryption identifier corresponding to the type of multi-digit number to be encrypted.

3. The encryption method for multi-digit numbers according to claim 1, wherein the predefined encryption cryptographic algorithm comprises a hash algorithm and a binary number conversion algorithm, a formula of the hash algorithm is:

$$Hash = Digest(Nl+Nr+K)$$

wherein, K represents a preset key corresponding to the multi-digit number to be encrypted, while Nl represents the second preset digits number on the leftmost side of the multi-digit number to be encrypted, Nr represents the third preset digits number on the rightmost side of the multi-digit number to be encrypted, and Hash represents a calculated Hash value;

a formula of the binary number conversion algorithm is:

$$Num = CalcNum(Hash)$$

wherein, Num represents a conversion of the calculated Hash value from binary to decimal.

4. The encryption method for multi-digit numbers according to claim 3, wherein a formula of the predetermined hybrid encryption algorithm is:

$$E\_Nm = (Nm+Num) \bmod 10^n$$

wherein, Nm represents the number segment to be encrypted, while Num represents a decimal operational value, n represents a number of digits of the number segment to be encrypted, and E_Nm represents the calculated hybrid encrypted number segment.

5. An encryption method for multi-digit numbers, applied to an encryption server, wherein the encryption method comprising:
    after receiving a preset-type of a multi-digit number to be encrypted, determining a number segment to be encrypted having first preset digits and determining a number segment not to be encrypted other than the number segment to be encrypted, according to rules for determination of predetermined encryption digits;
    performing a calculation on the determined number segment not to be encrypted to generate an operational value, by using a predefined encryption cryptographic algorithm and key, the key corresponding to the multi-digit number to be encrypted;
    performing a hybrid encryption operation on the number segment to be encrypted and the operational value generated, by employing a predetermined hybrid encryption algorithm for obtaining a hybrid encrypted number segment having the first preset digits; and
    replacing the number segment to be encrypted in the preset-type of multi-digit number to be encrypted with the hybrid encrypted number segment to generate an encrypted multi-digit number:
wherein the predefined encryption cryptographic algorithm comprises a hash algorithm and a binary number conversion algorithm, a formula of the hash algorithm is:

$$Hash = Digest(Nl+Nr+K)$$

wherein, K represents a preset key corresponding to the multi-digit number to be encrypted, while Nl represents a second preset digits number on a leftmost side of the multi-digit number to be encrypted, Nr represents a third preset digits number on a rightmost side of the multi-digit number to be encrypted, and Hash represents a calculated Hash value;

a formula of the binary number conversion algorithm is:

$$Num = \text{CalcNum}(Hash)$$

wherein, Num represents a conversion of the calculated Hash value from binary to decimal; and wherein a formula of the predetermined hybrid encryption algorithm is:

$$E\_Nm = (Nm + Num) \bmod 10^n$$

wherein, Nm represents the number segment to be encrypted, while Num represents a decimal operational value, n represents a number of digits of the number segment to be encrypted, and E_Nm represents the calculated hybrid encrypted number segment.

6. A decryption method for multi-digit numbers, applied to a decryption server, wherein the decryption method comprising:

after receiving a preset type of a multi-digit number to be decrypted, determining a number segment to be decrypted having first preset digits and determining a number segment not to be decrypted other than the number segment to be decrypted, according to rules for determination of predetermined encryption digits;

performing a calculation on the determined number segment not to be decrypted to generate an operational value, by using a predefined decryption cryptographic algorithm and key, the key corresponding to the multi-digit number to be decrypted;

performing a hybrid decryption operation of the number segment to be decrypted and the operational value generated, by employing a predetermined hybrid decryption algorithm for obtaining a hybrid decrypted number segment having the first preset digits; and replacing the number segment to be decrypted in the preset type of multi-digit number to be decrypted with the hybrid decrypted number segment to generate a decrypted multi-digit number;

wherein the rules for the determination of the predetermined decryption digits comprise:

a second preset digits number on a leftmost side of the multi-digit number to be decrypted is designated as a front number, while a third preset digits number on a rightmost side of the multi-digit number to be decrypted is designated a back number; the front and back numbers are designated as the number segment not to be decrypted, wherein, a sum of a number of digits of the second preset digits number and a number of digits of the third preset digits number is less than a number of digits of the multi-digit number to be decrypted; and after removing the front and back numbers from the multi-digit number to be decrypted, a remaining number segment is designated as the number segment to be decrypted.

7. The decryption method for multi-digit numbers according to claim 6, wherein the predefined decryption cryptographic algorithm comprises a hash algorithm and a binary number conversion algorithm, a formula of the hash algorithm is:

$$Hash = \text{Digest}(Nl + Nr + K)$$

wherein, K represents a preset key corresponding to the multi-digit number to be decrypted, while Nl represents the second preset digits number on the leftmost side of the multi-digit number to be decrypted; Nr represents the third preset digits number on the rightmost side of the multi-digit number to be decrypted, and Hash represents a calculated Hash value;

a formula of the binary number conversion algorithm is:

$$Num = \text{CalcNum}(Hash)$$

wherein, Num represents a conversion of the calculated Hash value from binary to decimal.

8. The decryption method for multi-digit numbers according to claim 7, wherein a formula of the predetermined hybrid decryption algorithm is:

$$Nm = (E\_Nm - Num) \bmod 10^n$$

wherein, E_Nm represents the number segment to be decrypted, while Num represents a decimal operational value, n represents a number of digits of the number segment to be decrypted, and Nm represents the calculated hybrid decrypted number segment.

9. A decryption method for multi-digit numbers, applied to a decryption server, wherein the decryption method comprising:

after receiving a preset type of a multi-digit number to be decrypted, determining a number segment to be decrypted having first preset digits and determining a number segment not to be decrypted other than the number segment to be decrypted, according to rules for determination of predetermined encryption digits;

performing a calculation on the determined number segment not to be decrypted to generate an operational value, by using a predefined decryption cryptographic algorithm and key, the key corresponding to the multi-digit number to be decrypted;

performing a hybrid decryption operation of the number segment to be decrypted and the operational value generated, by employing a predetermined hybrid decryption algorithm for obtaining a hybrid decrypted number segment having the first preset digits; and replacing the number segment to be decrypted in the preset type of multi-digit number to be decrypted with the hybrid decrypted number segment to generate a decrypted multi-digit number:

wherein the predefined decryption cryptographic algorithm comprises a hash algorithm and a binary number conversion algorithm, a formula of the hash algorithm is:

$$Hash = \text{Digest}(Nl + Nr + K)$$

wherein, K represents a preset key corresponding to the multi-digit number to be decrypted, while Nl represents a second preset digits number on a leftmost side of the multi-digit number to be decrypted; Nr represents a third preset digits number on a rightmost side of the multi-digit number to be decrypted, and Hash represents a calculated Hash value;

a formula of the binary number conversion algorithm is:

$$Num = \text{CalcNum}(Hash)$$

wherein, Num represents a conversion of the calculated Hash value from binary to decimal; and wherein a formula of the predetermined hybrid decryption algorithm is:

$$Nm = (E\_Nm - Num) \bmod 10^n$$

wherein, E_Nm represents the number segment to be decrypted, while Num represents a decimal operational value, n represents a number of digits of the number segment to be decrypted, and Nm represents the calculated hybrid decrypted number segment.

10. An encryption server comprising a memory and a processor, wherein the memory stores an encryption system for multi-digit numbers operable on the processor and when the processor executes the encryption system for multi-digit numbers, the following steps are implemented:

after receiving a preset type of a multi-digit number to be encrypted, determining a number segment to be encrypted having first preset digits and determining a number segment not to be encrypted other than the number segment to be encrypted, according to rules for determination of predetermined encryption digits;

performing a calculation on the determined number segment not to be encrypted to generate an operational value, by using a predefined encryption cryptographic algorithm and key, the key corresponding to the multi-digit number to be encrypted;

performing a hybrid encryption operation of the number segment to be encrypted and the operational value generated, by employing a predetermined hybrid encryption algorithm for obtaining a hybrid encrypted number segment having the first preset digits; and replacing the number segment to be encrypted in the preset type of multi-digit number to be encrypted with the hybrid encrypted number segment to generate an encrypted multi-digit number;

wherein the rules for the determination of the predetermined encryption digits include:

a second preset digits number on a leftmost side of the multi-digit number to be encrypted is designated a front number, while a third preset digits number on a rightmost side of the multi-digit number to be encrypted is designated a back number; the front and back numbers are designated as the number segment not to be encrypted, wherein, a sum of a number of digits of the second preset digits number and a number of digits of the third preset digits number is less than a number of digits of the multi-digit number to be encrypted; and after removing the front and back numbers from the multi-digit number to be encrypted, a remaining number segment is designated as the number segment to be encrypted.

11. The encryption server according to claim 10, wherein when the processor executes the encryption system for multi-digit numbers, the following steps are further implemented:

generating an encryption identifier for the encrypted multi-digit number according to predetermined rules for number encryption identifiers; wherein the predetermined rules for number encryption identifiers include:

in line with a meaning of the multi-digit number, converting one or more numbers with preset digits in the encrypted multi-digit number generated, into an encryption identifier corresponding to the type of the multi-digit number to be encrypted.

12. The encryption server according to claim 11, wherein the predefined encryption cryptographic algorithm comprises a hash algorithm and a binary number conversion algorithm, a formula of the hash algorithm is:

$$\text{Hash} = \text{Digest}(Nl+Nr+K)$$

wherein, K represents a preset key corresponding to the multi-digit number to be encrypted, while Nl represents the second preset digits number on a leftmost side of the multi-digit number to be encrypted, Nr represents the third preset digits number on the rightmost side of the multi-digit number to be encrypted, and Hash represents a calculated Hash value;

a formula of the binary number conversion algorithm is:

$$\text{Num} = \text{Calc}\textit{Num}(\text{Hash})$$

wherein, Num represents a conversion of the calculated Hash value from binary to decimal.

13. The encryption server according to claim 10, wherein the predefined encryption cryptographic algorithm comprises a hash algorithm and a binary number conversion algorithm, a formula of the hash algorithm is:

$$\text{Hash} = \text{Digest}(Nl+Nr+K)$$

wherein, K represents a preset key corresponding to the multi-digit number to be encrypted, while Nl represents the second preset digits number on the leftmost side of the multi-digit number to be encrypted, Nr represents the third preset digits number on the rightmost side of the multi-digit number to be encrypted, and Hash represents a calculated Hash value;

a formula of the binary number conversion algorithm is:

$$\text{Num} = \text{Calc}\textit{Num}(\text{Hash})$$

wherein, Num represents a conversion of the calculated Hash value from binary to decimal.

14. The encryption server according to claim 10, wherein a formula of the predetermined hybrid encryption algorithm is:

$$E\_Nm = (Nm+Num) \bmod 10^n$$

wherein, Nm represents the number segment to be encrypted, while Num represents a decimal operational value, n represents a number of digits of the number segment to be encrypted, and E_Nm represents the calculated hybrid encrypted number segment.

15. An encryption server comprising a memory and a processor, wherein the memory stores an encryption system for multi-digit numbers operable on the processor and when the processor executes the encryption system for multi-digit numbers, the following steps are implemented:

after receiving a preset type of a multi-digit number to be encrypted, determining a number segment to be encrypted having first preset digits and determining a number segment not to be encrypted other than the number segment to be encrypted, according to rules for determination of predetermined encryption digits;

performing a calculation on the determined number segment not to be encrypted to generate an operational value, by using a predefined encryption cryptographic algorithm and key, the key corresponding to the multi-digit number to be encrypted;

performing a hybrid encryption operation of the number segment to be encrypted and the operational value generated, by employing a predetermined hybrid encryption algorithm for obtaining a hybrid encrypted number segment having the first preset digits; and replacing the number segment to be encrypted in the preset type of multi-digit number to be encrypted with the hybrid encrypted number segment to generate an encrypted multi-digit number:

wherein the predefined encryption cryptographic algorithm comprises a hash algorithm and a binary number conversion algorithm, a formula of the hash algorithm is:

$$\text{Hash} = \text{Digest}(Nl+Nr+K)$$

wherein, K represents a preset key corresponding to the multi-digit number to be encrypted, while Nl represents a second preset digits number on a leftmost side of the multi-digit number to be encrypted, Nr represents a third preset digits number on a rightmost side of the multi-digit number to be encrypted, and Hash represents a calculated Hash value;

a formula of the binary number conversion algorithm is:

$$Num=CalcNum(Hash)$$

wherein, Num represents a conversion of the calculated Hash value from binary to decimal; and wherein a formula of the predetermined hybrid encryption algorithm is:

$$E\_Nm=(Nm+Num) \bmod 10^n$$

wherein, Nm represents the number segment to be encrypted, while Num represents a decimal operational value, n represents a number of digits of the number segment to be encrypted, and E_Nm represents the calculated hybrid encrypted number segment.

16. A decryption server comprising a memory and a processor, wherein the memory stores a decryption system for multi-digit numbers operable on the processor and when the processor executes the decryption system for multi-digit numbers, the following steps are implemented:

after receiving a preset type of a multi-digit number to be decrypted, determining a number segment to be decrypted having first preset digits and determining a number segment not to be decrypted other than the number segment to be decrypted, according to rules for determination of predetermined encryption digits;

performing a calculation on the determined number segment not to be decrypted to generate an operational value, by using a predefined decryption cryptographic algorithm and key, the key corresponding to the multi-digit number to be decrypted;

performing a hybrid decryption operation of the number segment to be decrypted and the operational value generated, by employing a predetermined hybrid decryption algorithm for obtaining a hybrid decrypted number segment having the first preset digits; and replacing the number segment to be decrypted in the preset type of multi-digit number to be decrypted with the hybrid decrypted number segment to generate a decrypted multi-digit number;

wherein the rules for the determination of the predetermined decryption digits include:

a second preset digits number on a leftmost side of the multi-digit number to be decrypted is designated as a front number, while a third preset digits number on a rightmost side of the multi-digit number to be decrypted is designated a back number; the front and back numbers are designated as the number segment not to be decrypted, wherein, a sum of a number of digits of the second preset digits number and a number of digits of the third preset digits number is less than a number of digits of the multi-digit number to be decrypted; and after removing the front and back numbers from the multi-digit number to be decrypted, a remaining number segment is designated as the number segment to be decrypted.

17. The decryption server according to claim 16, wherein the predefined decryption cryptographic algorithm comprises a hash algorithm and a binary number conversion algorithm, a formula of the hash algorithm is:

$$Hash=Digest(Nl+Nr+K)$$

wherein, K represents a preset key corresponding to the multi-digit number to be decrypted, while Nl represents the second preset digits number on the leftmost side of the multi-digit number to be decrypted; Nr represents the third preset digits number on the rightmost side of the multi-digit number to be decrypted, and Hash represents a calculated Hash value;

a formula of the binary number conversion algorithm is:

$$Num=CalcNum(Hash)$$

wherein, Num represents a conversion of the calculated Hash value from binary to decimal.

18. The decryption server according to claim 17, wherein a formula of the predetermined hybrid decryption algorithm is:

$$Nm=(E\_Nm-Num) \bmod 10^n$$

wherein, E_Nm represents the number segment to be decrypted, while Num represents a decimal operational value, n represents a number of digits of the number segment to be decrypted, and Nm represents the calculated hybrid decrypted number segment.

19. A decryption server comprising a memory and a processor, wherein the memory stores a decryption system for multi-digit numbers operable on the processor and when the processor executes the decryption system for multi-digit numbers, the following steps are implemented:

after receiving a preset type of a multi-digit number to be decrypted, determining a number segment to be decrypted having first preset digits and determining a number segment not to be decrypted other than the number segment to be decrypted, according to rules for determination of predetermined encryption digits;

performing a calculation on the determined number segment not to be decrypted to generate an operational value, by using a predefined decryption cryptographic algorithm and key, the key corresponding to the multi-digit number to be decrypted;

performing a hybrid decryption operation of the number segment to be decrypted and the operational value generated, by employing a predetermined hybrid decryption algorithm for obtaining a hybrid decrypted number segment having the first preset digits; and replacing the number segment to be decrypted in the preset type of multi-digit number to be decrypted with the hybrid decrypted number segment to generate a decrypted multi-digit number:

wherein the predefined decryption cryptographic algorithm comprises a hash algorithm and a binary number conversion algorithm, a formula of the hash algorithm is:

$$Hash=Digest(Nl+Nr+K)$$

wherein, K represents a preset key corresponding to the multi-digit number to be decrypted, while Nl represents a second preset digits number on a leftmost side of the multi-digit number to be decrypted; Nr represents a third preset digits number on a rightmost side of the multi-digit number to be decrypted, and Hash represents a calculated Hash value;

a formula of the binary number conversion algorithm is:

$$Num=CalcNum(Hash)$$

wherein, Num represents a conversion of the calculated Hash value from binary to decimal; and wherein a formula of the predetermined hybrid decryption algorithm is:

$$Nm=(E\_Nm-Num) \bmod 10^n$$

wherein, E_Nm represents the number segment to be decrypted, while Num represents a decimal operational value, n represents a number of digits of the number segment to be decrypted, and Nm represents the calculated hybrid decrypted number segment.

20. An encryption method for multi-digit numbers, applied to an encryption server, wherein the encryption method comprising:

after receiving a preset-type of a multi-digit number to be encrypted, determining a number segment to be encrypted having first preset digits and determining a number segment not to be encrypted other than the number segment to be encrypted, according to rules for determination of predetermined encryption digits;

performing a calculation on the determined number segment not to be encrypted to generate an operational value, by using a predefined encryption cryptographic algorithm and key, the key corresponding to the multi-digit number to be encrypted;

performing a hybrid encryption operation on the number segment to be encrypted and the operational value generated, by employing a predetermined hybrid encryption algorithm for obtaining a hybrid encrypted number segment having the first preset digits; and replacing the number segment to be encrypted in the preset-type of multi-digit number to be encrypted with the hybrid encrypted number segment to generate an encrypted multi-digit number:

wherein after replacing the number segment to be encrypted in the preset type of multi-digit number to be encrypted with the hybrid encrypted number segment to generate the encrypted multi-digit number, the method further comprising:

generating an encryption identifier for the encrypted multi-digit number according to predetermined rules for number encryption identifiers; wherein the predetermined rules for number encryption identifiers comprise:

in line with a meaning of the multi-digit number, converting one or more numbers with preset digits in the encrypted multi-digit number generated, into an encryption identifier corresponding to the type of multi-digit number to be encrypted;

wherein the predefined encryption cryptographic algorithm comprises a hash algorithm and a binary number conversion algorithm, a formula of the hash algorithm is:

$$Hash=\mathrm{Digest}(Nl+Nr+K)$$

wherein, K represents a preset key corresponding to the multi-digit number to be encrypted, while Nl represents a second preset digits number on a leftmost side of the multi-digit number to be encrypted, Nr represents a third preset digits number on a rightmost side of the multi-digit number to be encrypted, and Hash represents a calculated Hash value;

a formula of the binary number conversion algorithm is:

$$Num=\mathrm{Calc}Num(Hash)$$

wherein, Num represents a conversion of the calculated Hash value from binary to decimal; and wherein a formula of the predetermined hybrid encryption algorithm is:

$$E\_Nm=(Nm+Num) \bmod 10^n$$

wherein, Nm represents the number segment to be encrypted, while Num represents a decimal operational value, n represents a number of digits of the number segment to be encrypted, and E_Nm represents the calculated hybrid encrypted number segment.

21. An encryption server comprising a memory and a processor, wherein the memory stores an encryption system for multi-digit numbers operable on the processor and when the processor executes the encryption system for multi-digit numbers, the following steps are implemented:

after receiving a preset type of a multi-digit number to be encrypted, determining a number segment to be encrypted having first preset digits and determining a number segment not to be encrypted other than the number segment to be encrypted, according to rules for determination of predetermined encryption digits;

performing a calculation on the determined number segment not to be encrypted to generate an operational value, by using a predefined encryption cryptographic algorithm and key, the key corresponding to the multi-digit number to be encrypted;

performing a hybrid encryption operation of the number segment to be encrypted and the operational value generated, by employing a predetermined hybrid encryption algorithm for obtaining a hybrid encrypted number segment having the first preset digits; and replacing the number segment to be encrypted in the preset type of multi-digit number to be encrypted with the hybrid encrypted number segment to generate an encrypted multi-digit number:

wherein when the processor executes the encryption system for multi-digit numbers, the following steps are further implemented:

generating an encryption identifier for the encrypted multi-digit number according to predetermined rules for number encryption identifiers; wherein the predetermined rules for number encryption identifiers include:

in line with a meaning of the multi-digit number, converting one or more numbers with preset digits in the encrypted multi-digit number generated, into an encryption identifier corresponding to the type of the multi-digit number to be encrypted;

wherein the predefined encryption cryptographic algorithm comprises a hash algorithm and a binary number conversion algorithm, a formula of the hash algorithm is:

$$Hash=\mathrm{Digest}(Nl+Nr+K)$$

wherein, K represents a preset key corresponding to the multi-digit number to be encrypted, while Nl represents a second preset digits number on a leftmost side of the multi-digit number to be encrypted, Nr represents a third preset digits number on a rightmost side of the multi-digit number to be encrypted, and Hash represents a calculated Hash value;

a formula of the binary number conversion algorithm is:

$$Num=\mathrm{Calc}Num(Hash)$$

wherein, Num represents a conversion of the calculated Hash value from binary to decimal; and wherein a formula of the predetermined hybrid encryption algorithm is:

$$E\_Nm = (Nm + Num) \bmod 10^n$$

wherein, Nm represents the number segment to be encrypted, while Num represents a decimal operational value, n represents a number of digits of the number segment to be encrypted, and E_Nm represents the calculated hybrid encrypted number segment.

* * * * *